United States Patent [19]

Presley

[11] Patent Number: 4,744,285
[45] Date of Patent: May 17, 1988

[54] ALTERNATING VALVE

[75] Inventor: Glen T. Presley, Angola, Ind.

[73] Assignee: Applied Power Inc., Butler, Wis.

[21] Appl. No.: 24,021

[22] Filed: Mar. 10, 1987

[51] Int. Cl.4 .......................................... F15B 11/00
[52] U.S. Cl. ........................................ 91/513; 91/521;
91/534; 91/536; 91/517; 137/624.14;
137/624.18; 172/2; 172/28
[58] Field of Search ............... 91/521, 534, 536, 513,
91/517; 137/624.14, 624.18; 172/2, 28

[56] References Cited

U.S. PATENT DOCUMENTS

| 2,321,267 | 6/1943 | Werff | 91/521 |
| 3,556,149 | 1/1971 | Ribier | 137/624.18 |
| 3,626,967 | 12/1971 | McCarthy | 137/624.18 |
| 4,285,268 | 8/1981 | Deckler | 91/517 |
| 4,488,476 | 12/1984 | Diel et al. | 91/513 |

Primary Examiner—Robert E. Garrett
Assistant Examiner—Thomas E. Denion
Attorney, Agent, or Firm—C. Thomas Sylke; John C. Cooper, III; Fred Wiviott

[57] ABSTRACT

An automatic, hydraulically actuated, sequencing valve for use with a pair of hydraulic acutators (e.g. double acting hydraulic cylinders) includes a valve body having a cylindrical bore therein. Cam members at either end of the bore are engaged by pins on the ends of a cylindrical spool, thereby rotating the spool 30° each time it engages one of the cam members. A third cam member incorporated into the spool alternately locks open one of a pair of check valves as said spool is pressure shifted between the two bore cam members. The third cam member operates a locking system which permits only one of the two hydraulic cylinders to operate at a time and in sequence.

21 Claims, 2 Drawing Sheets

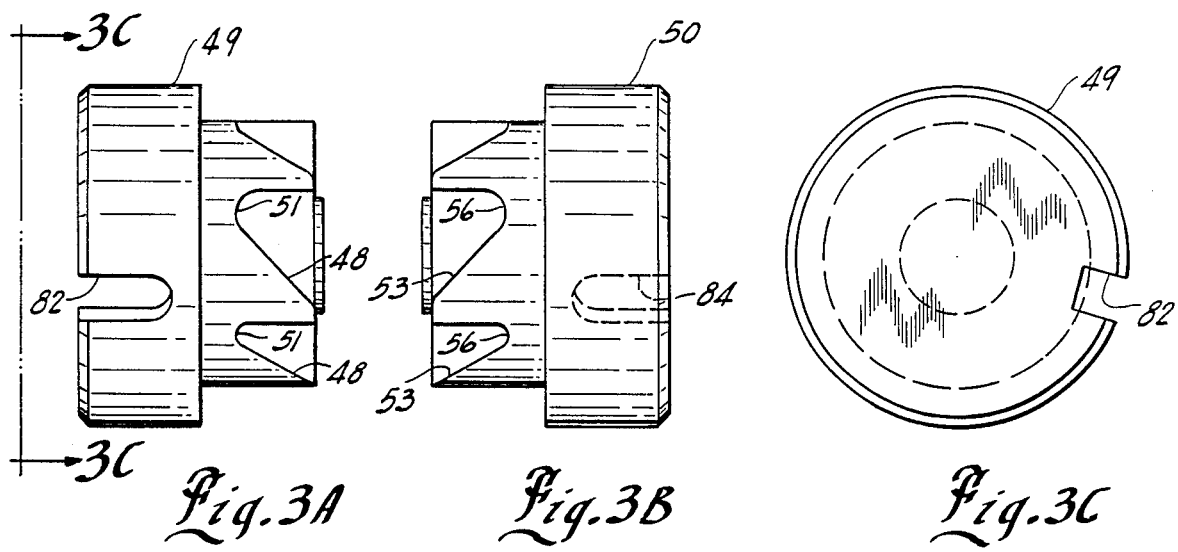
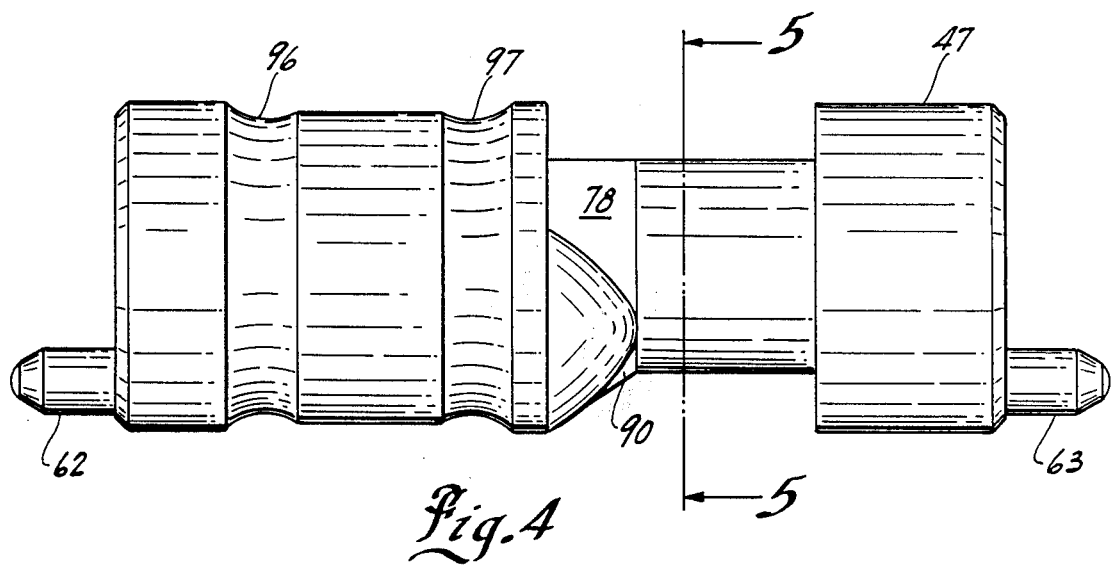
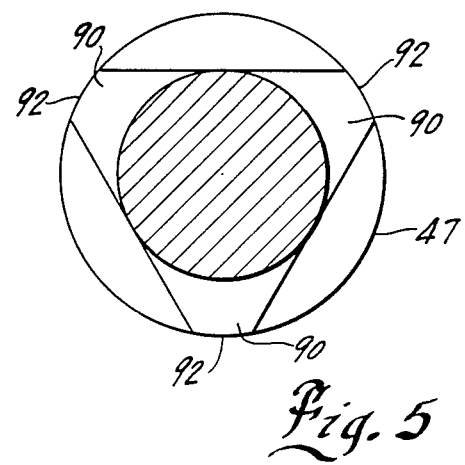

ALTERNATING VALVE

BACKGROUND OF THE INVENTION

1. Field of the Invention

The present invention relates generally to hydraulic valves and more particularly hydraulic alternating valves which may be utilized with devices requiring selected control of two hydraulic cylinders. Still more specifically, the preferred embodiment of the present invention relates to an alternating valve which may be utilized with a tractor pulled planter having row marker arms which are alternately hydraulically lowered as the planter changes direction in the field.

2. Description of the Prior Art

It is known in the farm equipment art that planters may be equipped with row markers which are selectively movable from a raised to a lowered position depending upon the particular step in the planting process. As described in U.S. Pat. No. 4,285,268 issued Aug. 25, 1981 to Deckler for "Automatic Sequencing Valve And System", it is desirable that row markers be used with a tractor-drawn or mounted implement such as a multi-row planter. In such planters, the ground wheels are at least partially retracted during one pass so that the planter is lowered into a planting position. To make sure that the field is completely covered during the planting operation, one marker on one end of the planter is lowered, such marker typically including a disc to make a suitable mark in the ground. When the farmer reaches the end of one pass, the marker arm is raised and the tractor is turned around for the next pass. The driver will then follow the mark made by the marker disc so that the planter will be spaced a desirable distance from the rows planted in the preceding pass. During this second pass, it is typical for the other marker arm to be lowered. The process is then repeated until the entire field has been covered.

The valve disclosed in the Deckler patent is an automatic, hydraulically actuated sequencing valve which includes a valve body, a bore and a-valve spool which is axially movable in the bore. The move is caused by creating a differential hydraulic pressure on opposite ends of the valve spool during each admission of hydraulic fluid under actuating pressure to the valve.

As in the Deckler system, most systems known to the art have been tied to the hydraulic lift cylinder on the planter itself, so that when the planter is raised the marker arms are both raised to the full up position, and when the planter is lowered, the proper marker arm is lowered. The Deckler system depends on pressure drops through small orifices to shift the spool. Pressure drop systems are known to be dependent on oil viscosity, flow rates and the loads imposed on the system. It has been found that this type of system is susceptible to malfunctions as conditions change, e.g. a change in the oil viscosity or flow rate.

Another type of alternating valve for such uses is shown in U.S. Pat. No. 4,488,476 issued Dec. 18, 1984 to Diel, et al for "Marker Control Valve". The valve of this patent includes a cam operated alternator valve spool that rotates the alternator spool 180° when the planter is lowered. It is believed by the present inventor that this method of alternating overcomes many of the problems of the Deckler type system but still has a major drawback. That major drawback is the expense required to manufacture the cam means used in the alternator valve spool. As shown in the Figures of that patent, the cam device includes an elaborate groove machined into the spool which rotates the spool 180° each time the planter is lowered. Such machining is labor intensive, slow and hence expensive.

It would represent a significant advance in this art if a valve could be developed which did not suffer from either disadvantage of the aforementioned prior art devices, especially if reliable operational results could be achieved using a valve spool which could be cast without requiring expensive machining operations.

OBJECTS AND SUMMARY OF THE INVENTION

It is a principal object of the present invention to provide an alternating valve which overcomes the aforementioned disadvantages of the prior art.

Another object of the present invention is to provide an alternating valve which may be used with devices, such as planter row marker arms, requiring selective flow of hydraulic fluid to separate cylinders.

A futher object of the present invention is to provide a new and improved camming means to rotate the alternator spool of a hydraulic valve 30° when the planter is raised and 30° when the planter is lowered.

How these and other objects of the present invention are achieved will be described in the following detailed description of the preferred embodiment, taken in conjunction with the FIGURES. Generally, however, the objects are accomplished by employing an alternator valve including a spool which is pressure shifted from end to end in the valve each time it is desired to change flow from the two outlet orifices. A cam member is provided on each end of the valve such that each time the spool is pushed to one end or the other, the spool is rotated 30°. A second cam arrangement is provided on the valve spool itself to alternately open a check valve connected to the base end of the cylinder to be operated, allowing it to conduct an operation such as the lowering of a planter marker arm. Other ways in which the objects of the invention are achieved will become apparent to those skilled in the art once the present specification has been read and understood. Such means are deemed to fall within the scope of the present invention.

DESCRIPTION OF THE DRAWINGS

FIGS. 3A and 3B are perspective views of the left and right hand valve cylinder cam members used in the valve of FIG. 2;

FIG. 3C is a side view of the left valve cylinder cam member taken along the line 3C—3C of FIG. 3A;

FIG. 4 is a center enlarged perspective view of the valve spool used in the valve of FIG. 2; and FIG. 5 is a sectional view taken along the line 5—5 of FIG. 4.

In the various FIGURES like reference numberals are used to indicate like components.

DESCRIPTION OF THE PREFERRED EMBODIMENT

Before proceeding to a description of the preferred embodiment, it must be understood that while the valve of the present invention is described in connection with its use in crop planter marker arm lift cylinder systems, the valve could be used in a variety of other applications. In fact, the valve of the present invention could be used in any system where alternating hydraulic fluid responses or sequencing is required. Furthermore, it should be understood that while the cam angles are 30° in the illustrated embodiment, the angles could vary depending on the number of valve outlet ports. The design of more complex valves will become readily apparent to those skilled in the art after the principles of the present invention have been read and understood.

Figure 1:
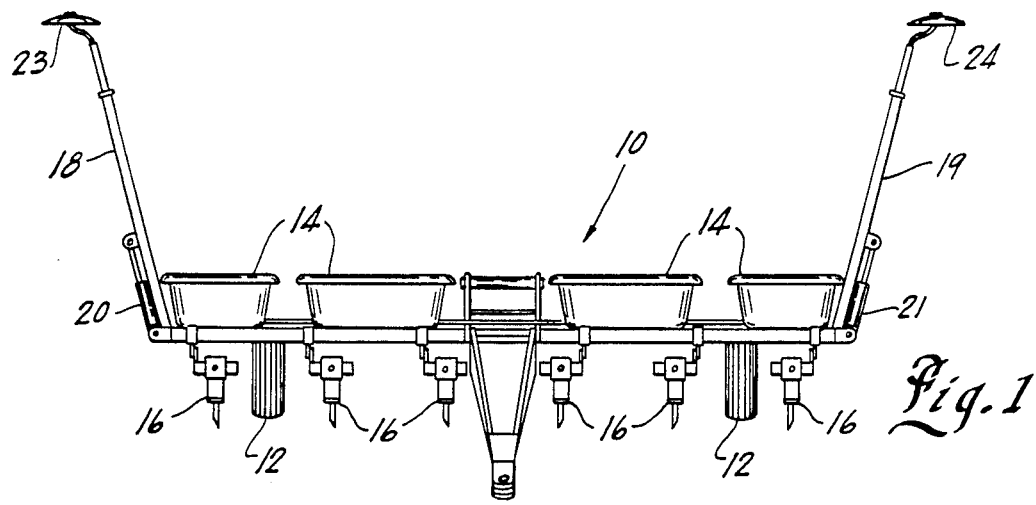
FIG. 1 is a schematic representation of a crop planting system with which the alternating valve of the present invention may be used.

FIG. 1 illustrates the preferred use of the alternating valve of the present invention wherein a planter 10 includes wheels 12, hoppers 14 for containing the seed to be planted, planting means 16 and a pair of marker arms 18 and 19 on the outboard ends of planter 10. The marker arms are equipped with hydraulic cylinders 20 and 21 respectively at their inner ends which are pivotally coupled to the planter 10 so that they can be lowered from the position shown to a generally horizontal position. The arms 18 and 19 are equipped with rotatable discs 23 and 24 on their outer ends. Since the components shown and described so far are well known, the planter is shown in only a general or schematic manner. What should be appreciated, however, is that when the hydraulic system for the planter allows the planting means 16 to be lowered to a planting position, one of the marker arms 18 or 19 will be lowered so that as a plurality of rows are being planted, a mark will be made in the adjoining soil to enable the operator to drive the pulling device for planter 10 (usually a tractor, not shown) down a precisely marked path to insure maximum planting coverage for a given acerage. It should also be appreciated that the marker arms 18 and 19 are alternated on each pass of the planter 10, i.e. each time the planting means 16 are raised and then lowered for a subsequent pass. Control of the marker arms and the planting machine in general is made possible by a control valve and lever or switch device in the cab of the tractor, all as will be more fully discussed below.

Figure 2:
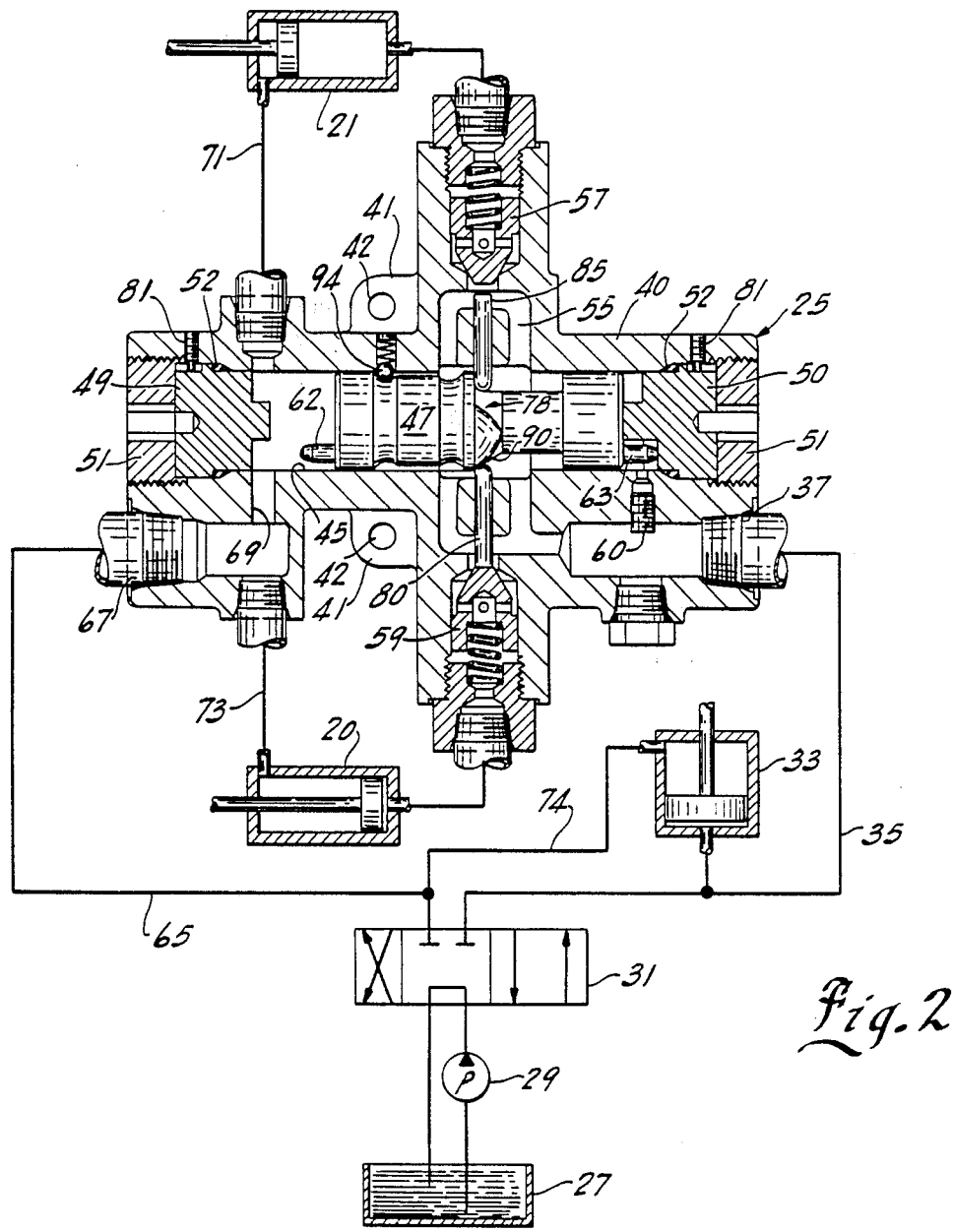
FIG. 2 is a cross-sectional view of the alternating valve according to the preferred embodiment of the present invention, with the various planter lift and marker cylinders shown in only general form.

Referring next to FIG. 2, the alternating valve 25 of the present invention is shown coupled to a hydraulic schematic which includes a tank 27 and a hydraulic pump 29 leading to the tractor control valve 31. The latter is coupled to a lift cylinder 33 for the planter 10 and to valve 25 which in turn is coupled to the inlet and outlet ports of the marker arm cylinders 20 and 21. Alternating valve 25 is integrated into the circuit so that when the planter lift cylinder 33 is raised, fluid pressure is forced through line 35 to the inlet or pressurization port 37 of valve 25.

Valve 25 includes a body portion 40, having flanges 41 thereon, flanges 41 including holes 42 for attachment of valve 25 to a suitable support. Valve 25 also includes a cylindrical bore 45, in which a spool 47 is slidably received. Spool 47 will be described in greater detail later. Mounted at the left and right ends of bore 45 are cam members 49 and 50 which are sealed within the bore by O-rings 52. Cam members 49 and 50 will also be described in greater detail later. Threaded members 51 hold cam members 49 and 50 in body 40.

Inlet or pressurization port 37 is coupled within the valve body 40 by an annular duct 55, which opens to check valves 57 and 59. When the check valves 57 and 59 are opened, fluid is allowed to be directed to the base end of the right marker arm cylinder 21 and the left marker arm cylinder 20 respectively. The end of the spool 47 is also subject to the inlet fluid from port 37 through an orifice 60.

When the planter lift cylinder 33 is raised, pressurized fluid passes through check valves 57 and 59 and both marker cylinders are raised. However, pressurized fluid moves spool 47 to the left causing pin 62 on the left end thereof to engage cam member 49 causing the spool 47 to rotate 30°. How this is accomplished will become clear after the spool and cam members are described later in greater detail.

When the planter lift cylinder 33 is lowered, pressurized fluid is forced through line 65 to the other valve inlet port 67 which is coupled by a chamber 69 to the space within bore 45 at the left end of spool 47. At the same time, pressurized fluid is forced through outlets 71 and 73 to the rod ends of the left and right marker cylinders 20 and 21 respectively as well as through line 74 to the rod end of the planter lift cylinder 33. The ends of the marker cylinders are still blocked by the check valves 57 and 59 until the spool 47 is moved to the right during this step, at which point the right spool pin 63 (see FIG. 4) engages cam member 50 to rotate the alternating valve spool 47 to the right another 30°. During this movement, a center cam 78 on the spool 47 is forced into engagement with the lift pin 80 of check valve 59 lifting the check poppet off of its seat to allow fluid to flow out of the base end of the left marker arm cylinder 20, thus allowing the cylinder 20 to lower the left marker arm 18. The right marker arm remains in the raised position since fluid flow from the base of cylinder 21 remains blocked by the poppet of valve 57.

While the center cam 78 will be described later in connection with the description of the spool 47, it should be mentioned here that three cam elements are present on spool 47, each spaced apart by 120°, so that each time the spool 47 moves back and forth (i.e. a complete cycle or 60° rotation) to the left and then to the right, one of the cam elements 78 will open the opposite check valve 57 and close valve 59, thus alternating flow from the base of the marker cylinders 20 and 21 so that the cylinders are alternately lowered.

As seen in FIG. 3A, left hand cam member 49 has six individual cam surfaces 48 and depressions 51. As spool 47 moves from right to left when marker arms 18, 19 are raised, pin 62 engages one of the individual cam surfaces 48 until stopped in one of the depressions 51. Spool 47 is held in that position as long as pressure is maintained from the right. Both cam members 49 and 50 are set and prevented from rotating by set screws 81 which engage slots 82 and 84 respectively as seen in FIG. 3C. There are six identical cam surface/depression configurations on member 49, allowing a 30° rotation upon each new engagement of that member.

Similarly, as seen in FIG. 3B, right hand cam member 50 has six identical cam surfaces 53 and depressions 56. Spool 47 moves to the right as one of the arms 18 or 19 is lowered and pin 63 engages a cam surface 53 until stopped in depression 56. The spool 47 is rotated another 30° as a result. Until fluid pressure is supplied to raise the marker arm being used, spool 47 will be held in its extreme right hand position, as shown in FIG. 2.

FIG. 4 shows the spool 47 in more detail. Pins 62 and 63 are found at opposing ends of spool 47 and engage cam members 49 and 50 respectively. Center cam 78 occupies a generally intermediate position on spool 47 and will be described in more detail below. Circumferential grooves 96 and 97 are likewise positioned in the main body portion of spool 47.

Grooves 96 and 97 are designed to keep spool 47 in position once it has shifted to either its far right position (shown in FIG. 2) or far left position when planter 10 is raised by cylinder 33. Spring-biased ball 94 engages groove 96 when spool 47 is positioned to the right and engages groove 97 when spool 47 is positioned to the left. The biasing of ball 94 is sufficient to hold spool 47 in place until fluid pressure is applied from one side.

Center cam 78, shown in FIG. 5, has three identical cam surfaces 90 and three hold points 92. In the orientation shown in FIG. 2, a hold point 92 is in contact with left pin 80 of check valve 59, thereby holding open that valve and allowing arm 18 to descend. After a full cycle (wherein spool 47 will have moved to the left, allowing pin 62 to engage member 49, and back to the right, allowing pin 63 to re-engage member 50), the spool 47 will have been rotated through two 30° arcs.

Operation

The operation of valve 25 will now be described in detail in connection with a tractor having a planter 10 of the type shown in FIG. 1. Beginning with the orientation shown in FIG. 2, the operator first switches valve 31 to send pressurized fluid to raise cylinder 33 and move spool 47 to the left. Spool 47 is rotated 30° and both pins 80, 85 are disengaged from check valves 59, 57 respectively.

When valve 31 is then switched to lower one of the marker arms, here arm 19, planter cylinder 33 lowers planter 10. Simultaneously, fluid pressure pushes spool 47 to the right into contact with member 50, thereby rotating spool 47 an additional 30°. In so moving, one of the hold points 92 of the center cam 78 of spool 47 forces pin 85 to push the poppet of check valve 57 off of its seat while leaving check valve 59 closed. Thus, cylinder 21 is allowed to retract and marker arm 19 descends.

Upon two more switchings of valve 31, one to raise arm 19 and the second to lower arm 18, valve 25 will be back in the orientation shown in FIG. 2, except that a different hold point 92 will be holding check valve 59 open via pin 80.

As is evident from the above description of the preferred embodiment, this valve configuration may be adpated to act on more than two cylinders by using additional pins and check valves. Practically any application requiring some type of alternating actuation of hydraulic elements could be adapted to use the present invention.

It will be readily apparent and obvious to those skilled in the art that a number of other changes and modifications may be made without departing from the spirit and scope of the present invention. Therefore, the above illustrated and described preferred embodiment serves as illustrative rather than limiting, the scope of the invention being limited only by the claims that follow.

What is claimed is:

1. A valve for alternately extending and retracting first and second hydraulic cylinders, said valve comprising:

a body having a cylindrical bore therein;

a generally cylindrical spool axially slidable between a first position and a second position within said bore;

means for axially rotating said spool a preselected angular amount after said spool has moved from said first position to said second position and back to said first position;

a first cam element on said spool and in surrounding orientation intermediate the ends thereof, said first cam element comprising three segments, each of said segments including a cam surface and a hold point, said segments being equally spaced about said first cam element;

first and a second check valves radially spaced apart relative to said spool and perpendicular thereto, said first and second check valves being oriented so that in normal operation, fluid is allowed to flow away from said spool, wherein the outlet of said first check valve is connected to the base end of said first hydraulic cylinder and the outlet of said second check valve is connected to the base end of said second hydraulic cylinder;

means for locking said first and second check valves in an open position, such that bidirectional fluid flow is allowed therethrough, when said spool moves to said first position;

a first port for supplying pressurized fluid to said check valves and to move said spool to said second position;

a second port for supplying fluid pressure to move said spool to said first position and to the outlet ends of said first and second hydraulic cylinders.

2. The valve as recited in claim 1 further comprising a pump connected to said first and second ports so that when said pump supplies fluid under pressure to said first port, said second port acts as an exhaust port for said valve and vice versa.

3. The valve as recited in claim 1 wherein said spool rotating means comprises second and third cam elements, said second cam element being mounted to one end of said bore and said third cam element being mounted at the opposing end of said bore, and cam engaging means mounted at either end of said spool arranged so that as said spool moves to said first position, said spool is rotated a preselected angular amount as said cam engaging means engages said second cam element, and as said spool moves to said second position, said spool is rotated another preselected angular amount as said cam engaging means engages said third ca element.

4. The valve as recited in claim 3 wherein said second and third cam elements each comprise a plurality of identical cam surfaces equally spaced circumferentially about each of said second and third cam elements, and said cam engaging means comprising a first pin at one end of said spool, said first pin designed to engage said second cam element, and a second pin at the opposing end of said spool, said second pin designed to engage said third cam element.

5. The valve as recited in claim 4 further comprising a pump connected to said first and second ports so that when said pump supplies fluid under pressure to said first port, said second port acts as an exhaust port for said valve and vice versa.

6. The valve as recited in claim 5 wherein fluid is provided to said check valves from said first port by a generally annular passageway surrounding said first cam element.

7. The valve as recited in claim 1 further comprising means for holding said spool in said first and second positions until fluid pressure is provided at either of said first and second ports.

8. The valve as recited in claim 7 wherein said holding means comprises:
a first circumferential groove in said spool intermediate the ends thereof;
a second circumferential groove in said spool intermediate the ends thereof and axially spaced apart from said first groove;
a pressure element partially extending into said bore designed to engage said first and second grooves and hold said spool thereby, said pressure element being biased radially inward to said spool.

9. A valve for selectively controlling first and second hydraulic cylinders, said valve comprising:
a body having a cylindrical bore therein;
first and second cam members at opposing ends of said bore;
a generally cylindrical spool, having a first pin at the first end and a second pin at the second end, and being axially slidable within said bore between a first position, wherein said first pin of said spool engages said first cam member and a second position wherein said second pin of said spool engages said second cam member such that each time said spool moves from said first to said second position or vice versa said spool is progressively rotated 30°;
a third cam member on said spool and intermediate the ends thereof, said third cam member having three cam surfaces equally spaced about said spool;
a first check valve radially spaced from said third cam member and first locking means therefor, said first check valve being oriented so that the poppet of said first check valve is normally biased toward said third cam member, said first locking means situated between said first check valve and said third cam member and movable between a first normal position and a second operative position;
a second check valve and second locking means configured and oriented identically to said first check valve and said first locking means, except that said second check valve and said second locking means are diametrically opposite said first check valve and said first locking means relative to said third cam member;
an inlet port for providing fluid under pressure to said second end of said spool and said first and second check valves;
an outlet port capable of providing fluid pressure to said first end of said spool and the retract inlets of said first and second hydraulic cylinders;
wherein said first and second check valves are respectively connected to said first and second hydraulic cylinders at their base inlets;
a hydraulic pump capable of alternately supplying fluid pressure to said inlet port and said outlet port; and
wherein when said inlet port is supplied with fluid, said spool moves to said first position thereby disengaging said first and second locking means and thereby causing extension of said first and second cylinders if either is in its retracted position, and wherein when said outlet port is supplied with pressurized fluid, said spool moves to said second position such that each time said spool is in said second position said third cam member alternately moves said first and second locking means to said operative position, thereby permitting said first hydraulic cylinder to retract when said first locking means is in its operative position and thereby locking open said first check valve and permitting said second hydraulic cylinder to retract when said second locking means is in its operative position thereby locking open said second check valve.

10. The valve as recited in claim 9 wherein said first and second locking means each comprises a poppet and a pin normal to said spool, said pin engaging said third cam member such that each time said spool is in said second position, said third cam member alternately moves the pin of said first locking means and the pin of said second locking means into said operative position wherein the pin holds open the poppet of one of said first and second check valves.

11. The valve as recited in claim 10 wherein fluid is provided to said first and second check valves from said inlet port by a generally annular passageway surrounding said third cam member.

12. The valve as recited in claim 9 further comprising means for holding said spool in said first and second positions until fluid pressure is provided at either of said inlet and outlet ports.

13. The valve as recited in claim 12 wherein said holding means comprises:
a first circumferential groove in said spool intermediate the ends thereof;
a second circumferential groove in said spool intermediate the ends thereof and axially spaced apart from said first groove;
a pressure element partially extending into said bore designed to engage said first and second grooves and hold said spool thereby, said pressure element being biased radially inward to said spool.

14. A planter including wheels, at least one hopper, planting means and first and second marker arms designed to demarcate reference lines in the ground being planted, said marker arms designed to be individually and alternately lowered, said first and second marker arms being controlled by first and second hydraulic cylinders respectively and a valve designed to control said first and second hydraulic cylinders, said valve comprising:
a body having a cylindrical bore therein;
a generally cylindrical spool axially slidable between a first position and a second position within said bore;
means for axially rotating said spool a preselected angular amount after said spool has moved from said first position to said second position and back to said first position;
a first cam element on said spool and in surrounding orientation intermediate the ends thereof, said first cam element comprising three segments, each of said segments including a cam surface and a hold point, said segments being equally spaced about said first cam element;
first and a second check valves radially spaced apart relative to said spool and perpendicular thereto, said first and second check valves being oriented so that in normal operation, fluid is allowed to flow away from said spool, wherein the outlet of said first check valve is connected to the base end of said first hydraulic cylinder and the outlet of said second check valve is connected to the base end of said second hydraulic cylinder;

means for locking said first and second check valves in an open position, such that bidirectional fluid flow is allowed therethrough, when said spool moves to said first position;

a first port for supplying pressurized fluid to said check valves and to move said spool to said second position;

a second port for supplying fluid pressure to move said spool to said first position and to the outlet ends of said first and second hydraulic cylinders.

15. The combination as recited in claim 14 further comprising a pump connected to said first and second ports so that when said pump supplies fluid under pressure to said first port, said second port acts as an exhaust port for said valve and vice versa.

16. The combination as recited in claim 14 wherein said spool rotating means comprises second and third cam elements, said second cam element being mounted to one end of said bore and said third cam element being mounted at the opposing end of said bore, and cam engaging means mounted at either end of said spool arranged so that as said spool moves to said first position, said spool is rotated a preselected angular amount as said cam engaging means engages said second cam element, and as said spool moves to said second position, said spool is rotated another preselected angular amount as said cam engaging means engages said third cam element.

17. The combination as recited in claim 16 wherein said second and third cam elements each comprise a plurality of identical cam surfaces equally spaced circumferentially about each of said second and third cam elements, and said cam engaging means comprising a first pin at one end of said spool, said first pin designed to engage said second cam element, and a second pin at the opposing end of said spool, said second pin designed to engage said third cam element.

18. The combination as recited in claim 17 further comprising a pump connected to said first and second ports so that when said pump supplies fluid under pressure to said first port, said second port acts as an exhaust port for said valve and vice versa.

19. The combination as recited in claim 18 wherein fluid is provided to said check valves from said first port by a generally annular passageway surrounding said first cam element.

20. The combination as recited in claim 14 further comprising means for holding said spool in said first and second positions until fluid pressure is provided at either of said first and second ports.

21. The combination as recited in claim 20 wherein said holding means comprises:

a first circumferential groove in said spool intermediate the ends thereof;

a second circumferential groove in said spool intermediate the ends thereof and axially spaced apart from said first groove;

a pressure element partially extending into said bore designed to engage said first and second grooves and hold said spool thereby, said pressure element being biased into said bore.

* * * * *